United States Patent [19]

Corner

[11] Patent Number: 5,435,616
[45] Date of Patent: Jul. 25, 1995

[54] TRUCK BED AIR FLOW DIRECTOR

[76] Inventor: Craig S. Corner, 20 Lyden St., Plymouth, Mass. 02360

[21] Appl. No.: 161,151

[22] Filed: Dec. 2, 1993

[51] Int. Cl.⁶ .................................................. B62D 35/00
[52] U.S. Cl. ............................. 296/180.1; 296/37.6; 296/50
[58] Field of Search .................. 296/37.6, 50, 57.1, 296/180.1, 180.2, 37.16

[56] References Cited

U.S. PATENT DOCUMENTS

| | | | |
|---|---|---|---|
| 3,656,800 | 4/1972 | Timmons et al. | 296/50 |
| 4,451,075 | 5/1984 | Canfield | 296/37.6 |
| 4,506,870 | 3/1985 | Penn | 296/180.1 |
| 4,585,263 | 4/1986 | Hesner | 296/180.1 |
| 4,861,088 | 8/1989 | Fedrigo | 296/57.1 |
| 4,917,430 | 4/1990 | Lawrance | 296/37.6 |
| 4,932,705 | 6/1990 | Miller | 296/50 |
| 5,154,470 | 10/1992 | Bringman, Jr. | 296/57.1 X |

*Primary Examiner*—Dennis H. Pedder
*Attorney, Agent, or Firm*—Wolf, Greenfield & Sacks

[57] ABSTRACT

Method and apparatus for reducing wind resistance of an open bed truck, by use of an air flow director in the rear of the truck bed. The air flow director can be stowed in a compartment of the truck (such as the cab of the truck or a special-purpose air flow director cavity formed in the truck, when not in use, and may be folded before stowing.

16 Claims, 5 Drawing Sheets

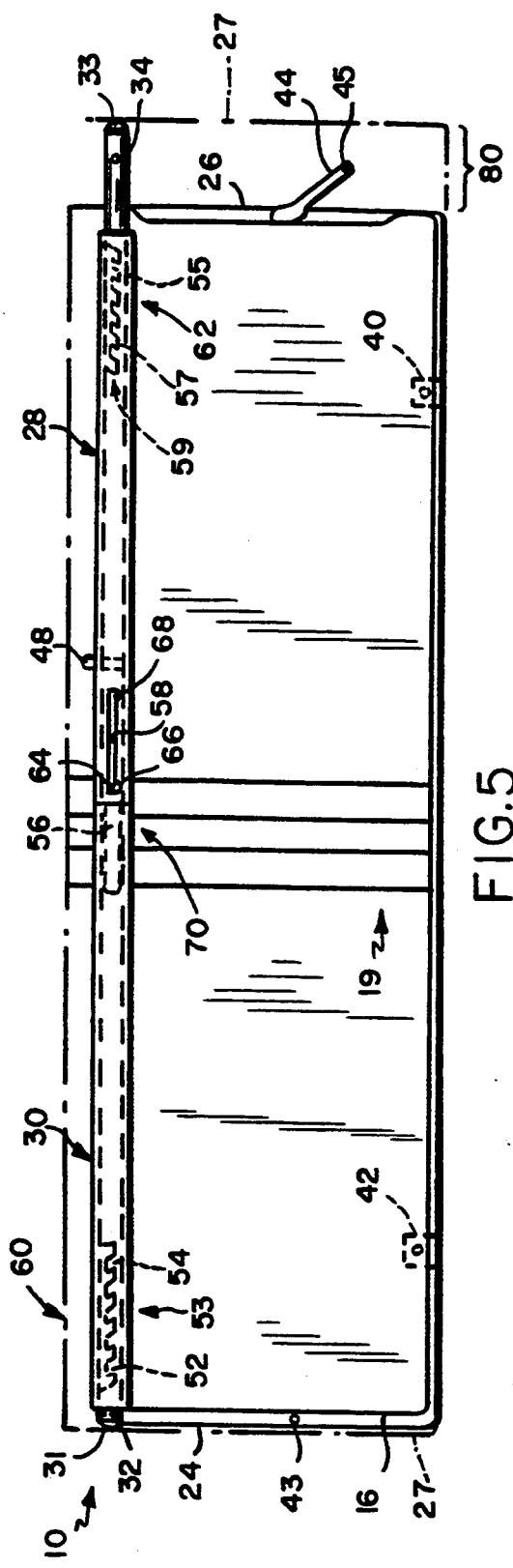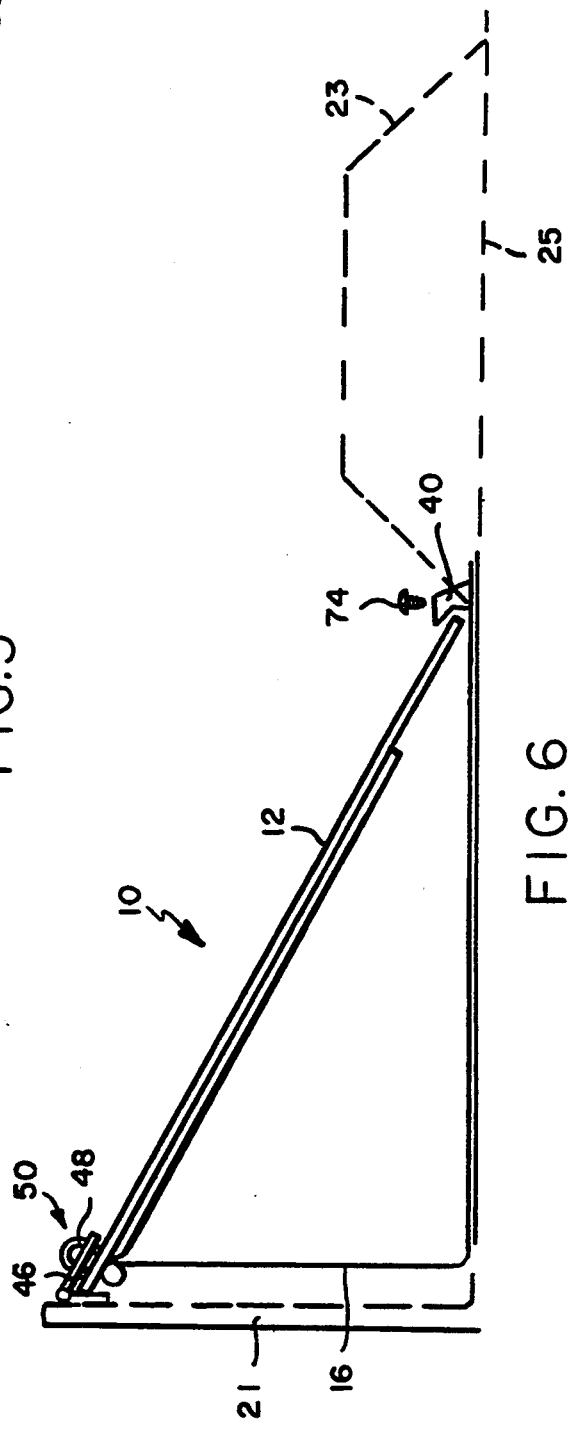

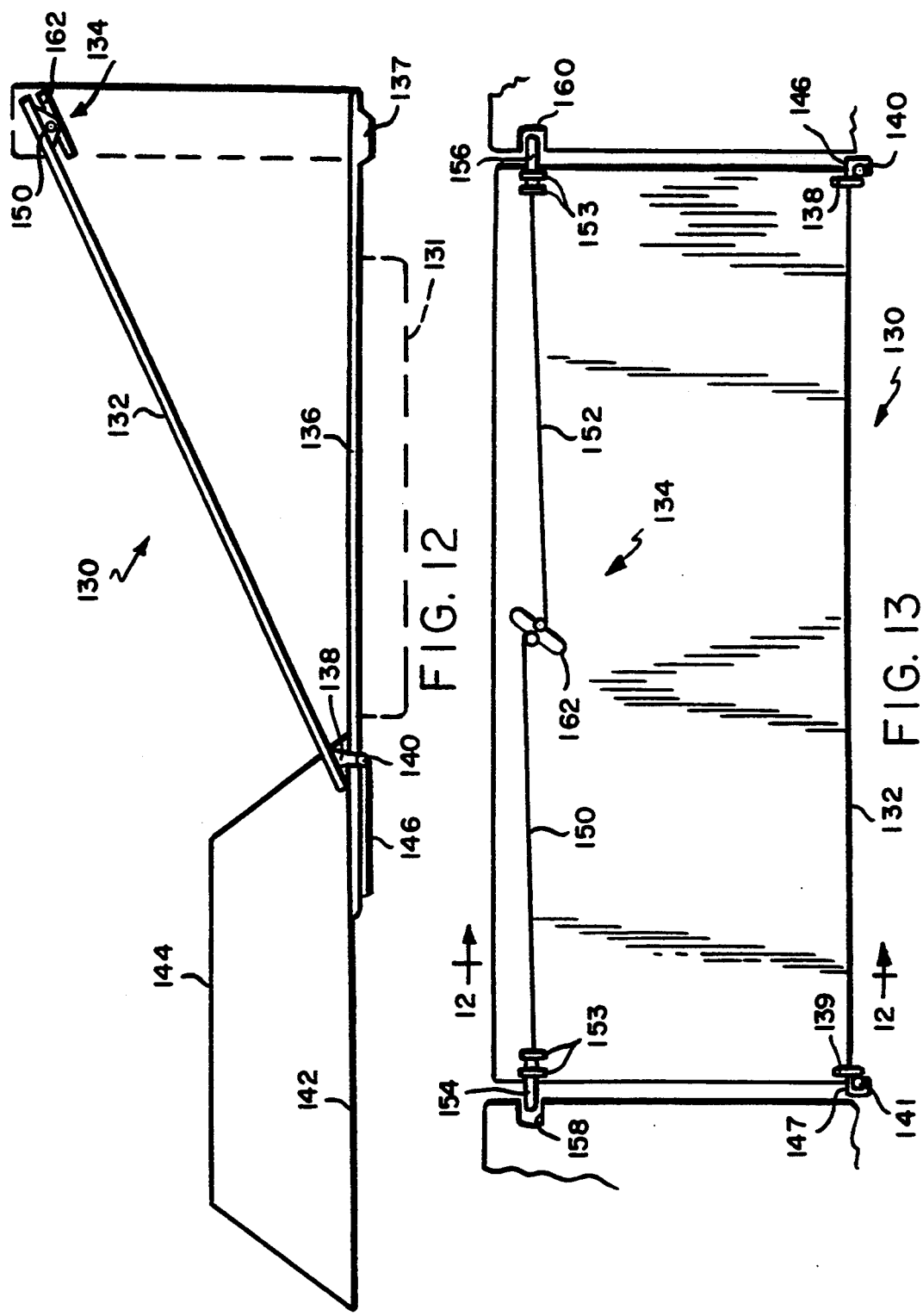

TRUCK BED AIR FLOW DIRECTOR

FIELD OF THE INVENTION

The present invention relates to inclined truck bed air flow directors for installation in the rear of open bed trucks to reduce air drag against the tailgate.

BACKGROUND OF THE INVENTION

It is known to place an inclined panel at the back of a truck bed to reduce the air drag normally caused by the truck's upright tailgate. A lock can be provided on this type of device to create a secure storage compartment underneath the panel. The panel may be installed in the truck using a hinge, and placed flat on the truck bed when not in use.

Alternatively, the device can be designed to be removable. Use of this type of device can reduce wind resistance of the truck, therefore increasing fuel efficiency, and may also improve traction and handling, particularly at high speed, by providing a downward force on the back of the truck.

Prior art devices, however, present certain disadvantages when not in use. In particular, when the device is left on the bed of the truck, it may use up valuable cargo volume, leave uneven edges protruding into the bed space, and subject the device to the wear and tear of loading, unloading, and shifting of the cargo. Alternatively, prior art removable devices tend not to be easily stored, once they are removed from the truck bed.

These problems are important when a typical actual patterns of truck usage are considered. Indeed, truck operators often drive trucks empty during part of a trip and drive them loaded during another part of the same trip. For example, they may drive an empty truck to a remote location, and then pick up cargo. They may also bring cargo to a remote location and return with the truck empty. If the device interferes with the cargo, risks being broken, or otherwise reduces the utility of the truck, it will be used seldom, if ever. Such a user therefore will not benefit from the fuel savings that he or she might have had in traveling during a portion of a trip when the truck bed is empty, and will also not benefit from the improved handling, particularly at high speed, which such devices provide.

SUMMARY OF THE INVENTION

In general, the invention features a method of operating an open bed truck, which includes driving the truck with an air flow director installed at the rear of the truck bed when the bed is substantially empty and stowing the air flow director in a compartment of the truck to facilitate the loading of cargo. The air flow director may be folded before stowing, and the compartment may be the cab of the truck or a special-purpose air flow director cavity in the truck.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 is a rear view of another variant of the air flow director of FIG. 1 with portions of the truck shown in phantom;

FIG. 6 is a side view of the director of FIG. 5 with portions of the truck shown in phantom;

FIG. 12 is a cross-section of the rear portion of a truck showing a third embodiment of an air flow director according to the invention, as shown by 12—12 in FIG. 13; and FIG. 13 is a rear view of the embodiment of FIG. 12.

DESCRIPTION OF THE PREFERRED EMBODIMENT

Figure 1:
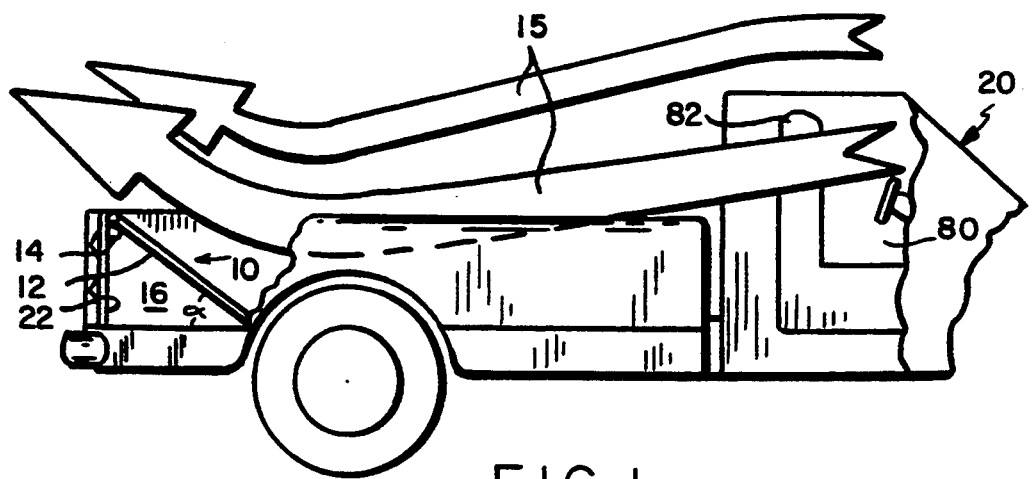
FIG. 1 is a partial diagrammatic side view of a truck shown partly cut away, with an air flow director according to the invention installed.
Figure 2:
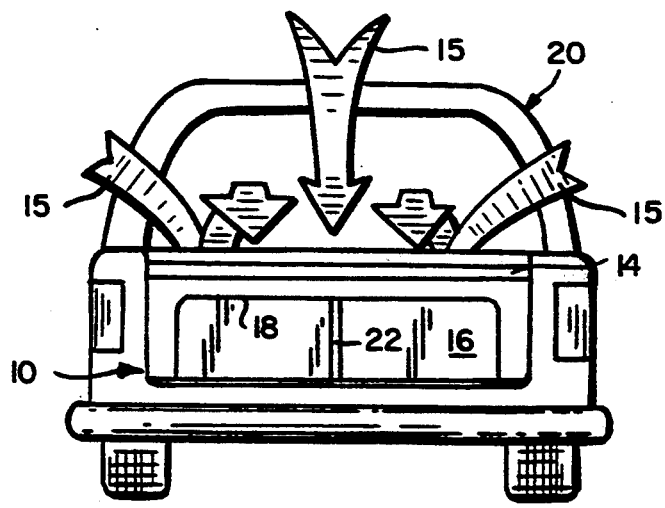
FIG. 2 is a rear view of the truck of FIG. 1 shown with its tailgate removed and the air flow director of FIG. 1 installed.

Referring to FIGS. 1 and 2, an exemplary air flow director 10 according to the invention is designed to be installed in the back end of an open bed truck 20, such as a pickup truck. Generally, this air flow director includes a deflector panel 12, a beam 14, and an optional storage bag 16. The rear surface of the bag includes an opening, such as a zippered opening 18, for access to the bag. A foot, or post 22, may support the beam and/or the panel, preferably near the center of the beam.

Use of the air flow director 10 according to the invention reduces the wind resistance of the truck by directing air flow 15 upwards and out of the bed, which can result in significantly improved fuel efficiency. The device may improve handling of the vehicle as well, by reducing or eliminating destabilizing vortices. Handling can also be improved because the device translates some wind drag into a downward force, improving tire traction.

Figure 3:
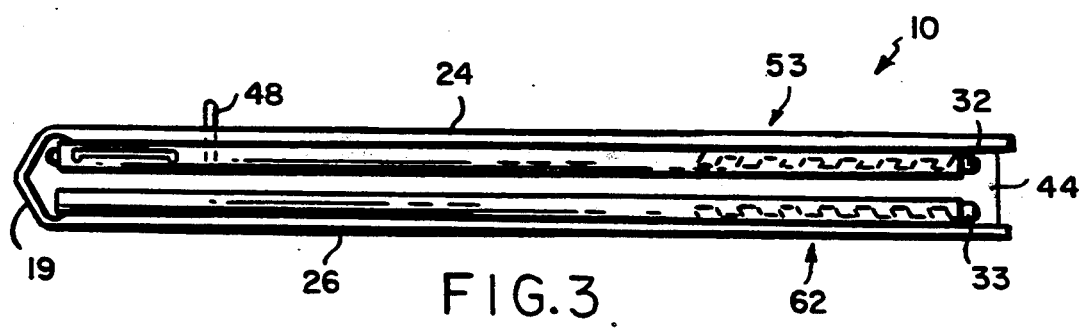
FIG. 3 is a end view of the air flow director of FIG. 1 shown in its folded position.
Figure 4:
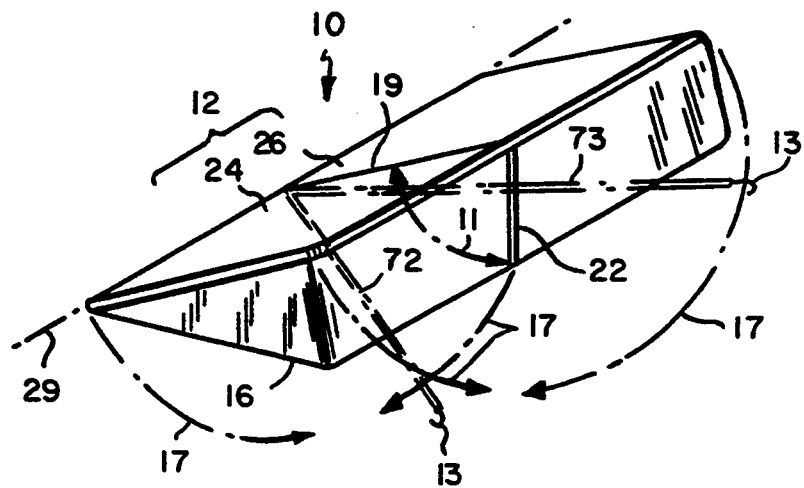
FIG. 4 is a diagrammatic perspective view of a variant of the air flow director of FIG. 1 shown in its operating position.

Referring to FIG. 4, the deflector panel 12 of the air flow director 10 is split into left and right subpanels 24 and 26, respectively, by a hinge 19 perpendicular to an axis 29, which axis is parallel to the rear axle of the truck. The air flow director may therefore be folded in half (see dashed arrows 17), making it approximately half as wide as it was in its operating position (see FIG. 3).

Referring to FIGS. 5 and 6, the left and right deflector panels (24 and 26 respectfully) may be made of plastic and held together in pivotal relationship by a five-crease living hinge 19. The panels are supported by right and left halves 28, 30, respectively, of the beam 14, which halves are preferably made of metallic tubing. These can be attached to the panels using channel clips (not shown), which are discussed below in connection with FIGS. 7-10. The right and left beam halves are held in alignment in the operating position by a latching mechanism 70. Length adjustment mechanisms 60, 62 are provided on the ends of the two halves of the beam.

The latching mechanism 70 includes a bolt 56 with a pin 64 inserted in its side. The bolt is slideably located in the right half 28 of the beam, and the pin protrudes through a slot 58 in the beam half. Two notches 66, 68 in the slot define resting positions for the pin in the operating and folded positions, respectively. A cotter pin or the like (not shown) may be placed through a hole in the bolt and a hole in the left beam half 30 when the holes are aligned, to hold the latch in its closed position.

The left length adjustment mechanism 60 includes a telescoping shaft 32 slideably disposed within the left beam half 30, and a stud which engages a locking wing nut 54 is provided on the side of the shaft in such a way that the stud protrudes through a toothed slot 53 in the beam half. The teeth 52 of the toothed slot are preferably slightly inclined to prevent slippage of the shaft. The right length adjustment mechanism 62 is similarly constructed with a telescoping shaft 34, stud/wing nut combination 55, and toothed slot 59. Each of the shafts 32, 34 includes a tip 31, 33 respectively, which is preferably flexible for effective gripping of the sides 27 of the truck 20.

A U-bolt or eyelet 48 is provided at the top of one of the deflector panels 24, 26. A corresponding hasp 46 is attached to the tailgate 21 near the top, preferably using screws. This hasp is positioned in such a way as to engage the U-bolt when the air flow director is installed in its operating position. Together the U-bolt and the hasp form a locking mechanism 50, which secures the air flow director in place and prevents its theft or theft of items stowed in bag(s) 16 or otherwise below the director.

A fastening tie 44, such as a sturdy rubber band, is provided at the side of one of the panels. This rubber band can include a snap 45, or hook, which cooperates with a snap, notch, or hole 43 on the other panel to keep the air flow director in its folded position during storage (see FIG. 3).

Optional mounting brackets 40, 42 may be mounted on the truck bed or liner 25 near the wheel wells 23 using a screw 74 or other fastener. These mounting brackets provide sturdy support for the air flow director, but are not absolutely necessary. Instead, two straps 72, 73 (see FIG. 4) are provided, which may be elastic or adjustable, each of these steps bearing a hook 13 which can be attached to the truck in such a way that the straps hold the lower edge of the air flow director in place by pulling it toward the back of the truck. A second set of straps may also be used to hold the top of the air flow director in place with a generally downward force component, thus eliminating the need for the beam 14. The hooks may be attached to any suitable hole or protrusion in the tailgate or in the truck walls.

Three general methods have been presented for supporting the director in the above variants of an embodiment, a beam, a post, straps, and brackets. These may be used alone or in combination to achieve different variants of the embodiment, while retaining the benefits of the invention. For example, the variant shown in FIGS. 1, 2, and 3 employs both a beam and the variant shown in FIGS. 5 and 6 employs a beam and brackets. It is further possible to use a variant according to the invention without brackets, straps or the like to hold the lower edge of the panel in place. In this type of air flow director, the air flow and the upper support mechanism hold the lower edge in place. A locking mechanism may or may not be used in the different variants. The post may also be adjustable in length, and can pivot in a plane parallel to the tailgate, instead of in the direction shown in FIG. 4.

In operation, referring to FIGS. 1-3, 5 and 6, the user takes the air flow director 10 and places it in the back of the truck 20 with the tailgate open, in the approximate inclined position that it is to occupy in the truck. If the air flow director has been adjusted for use in that vehicle, the user arranges the air flow director in a partially folded position, placing the rubber tips 31, 33 against the sides 27 of the truck bed, near the top of the tailgate opening. The user then pulls or pushes down on the center of the air flow director in the vicinity of the top of the hinge 19 until the air flow director is flat. If the air flow director is properly adjusted this will cause the tips 31, 33 on the two ends of the beam 14 to press up against the sides of the truck and support the deflector panel 12. In operation, therefore, the beam halves 28, 30 butt together and the whole beam is in compression, which supports the director. If brackets 40, 42 are used, the lower edge of the panel 14 will rest against them.

With the air flow director held in this way, the user grasps the pin 64 and moves the latch 56 from the open position to the closed position. This holds the beam halves 28, 30 in a straight line, and the deflector panels 24, 26 coplanar. In the case of a strap-and-beam mounted system, the user can then attach the straps 72, 73 to the tailgate, the bed, or any other suitable location in the back of the truck if he or she has not yet done so.

To adjust the air flow director for a different vehicle, the user adjusts one or both of the length adjustment mechanisms 60, 62. This is done by moving one or both of the shafts 32, 34 to a position that yields the proper compression when the beam is straightened. In this operation, either of the wing nuts 54, 55 can be used to secure either of the shafts 32, 34 against one of the teeth 52, 57 in the toothed slots 53, 59 in the beam. Although it is preferable to have two length adjusting mechanisms 60, 62 it is possible to operate the system of the invention using a single mechanism.

In variants of the embodiment using a post, the post 22 can be pivoted downward before or after the panel 12 is unfolded (see dashed arrow 11 in FIG. 4). Referring to FIG. 4, installation of variants that do not employ a beam can be somewhat similar, even though such a variant may not forcibly engage the sides of the truck. In particular, the air flow director is placed at the back of the truck in a partially folded position, and then straightened. This is because it can otherwise be difficult to move the air flow director into position in some trucks, as the wheel wells 23 or any lip at the top of the sides of the truck may present obstacles to the unfolded panel.

The living hinge 19 may provide some amount of adjustability to the width of the panel 12. Any remaining difference 80 between the width of the panel and the space between the sides of the truck is preferably, but need not be, evenly divided between the two sides (i.e., the air flow panel director should be centered). This space may arise, for example, when the device is to be used for the same truck both with and without a bed liner. This space can be adjusted by sliding the panels 24, 26 with respect to the beam 14, or by adjusting the length adjustment mechanisms 60, 62. A total space of around three inches has been found to be acceptable in operation, but more space may be tolerable. A gasket may also be provided to take up some of the space.

Referring to FIG. 1, a preferred angle α for the air flow director of the invention is around 30° ±5° from the truck bed. This angle has been found to increase stability and reduce turbulence most effectively. This angle, however, is not a limitation on the invention.

To remove the device, the user opens the latching mechanism and presses or pulls upward in the area of the hinge to partly fold the device. The device can then be fully folded to the position shown in FIG. 3 and stored in the truck cab 80 behind the seats 82, in a storage compartment located in the rear of the truck, or in another suitable location.

Figure 7:
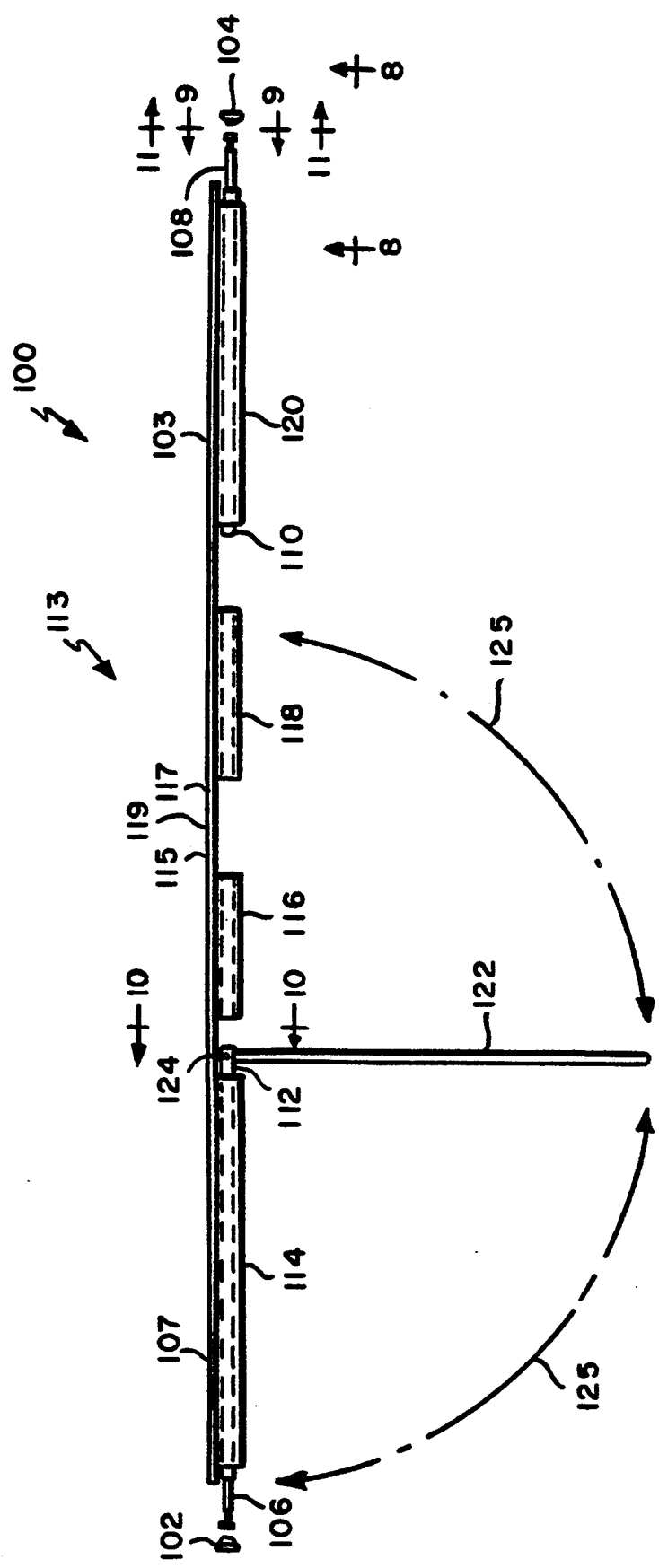
FIG 7 is an end view of a second embodiment of an air flow director according to the invention.

Referring to FIG. 7, a second embodiment 100 of the invention, includes right and left deflector panels 103, 107 onto which are attached a series of channel clips 114, 116, 118, 120. The panels and clips are preferably made of plastic and attached to each other using an adhesive, thermal bonding, screws or other suitable means. The two central clips 116, 118 are slightly offset from the outer ones 114, 120, as will be apparent from the discussion of FIG. 10.

The leftmost clip 114 accepts a left beam segment 112, which is pivotably attached to a central pivoting beam segment 122 using a hinge pin 124. A right beam segment 110 is held in the rightmost clip 120. The left and right beam segments each include respective spring loaded slugs 106, 108, which are designed to engage respective left and right mounting brackets 102, 104. The two panels 107, 103 are separated by a living hinge 113 formed by two creases 115, 117 separated by a central panel portion 119.

Figure 8:
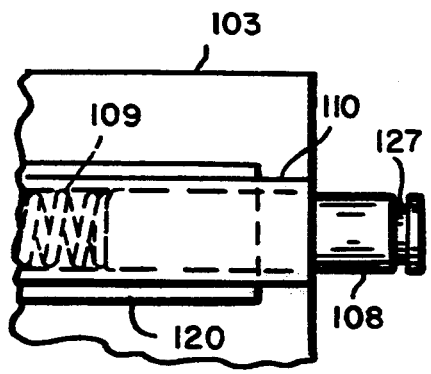
FIG. 8 is a detail view of the right edge of the air flow director of FIG. 7, seen from below as indicated by 8—8 in FIG. 7, and shown partially in phantom with portions of the right clip cut away.
Figure 11:
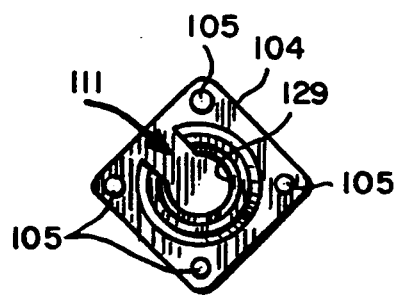
FIG. 11 is a side view of a bracket for the embodiment of FIG. 7, as indicated by 11—11.

Referring to FIGS. 8 and 11, the right spring loaded slug 108 is biased outward by a spring 109 housed in the right beam segment 110. The spring is designed to press the slug outwardly with a bias of about 5 pounds-force. The right slug is designed to engage the right bracket 104, which may be mounted in the truck by screws 105. Preferably, a notch 127 in the slug engages a ridge 129 in the bracket. The bracket is mounted diagonally, so that an opening 111 in the bracket faces upward and toward the front of the truck. This opening allows the slug to be slid into the bracket diagonally downward and backward with respect to the truck. This direction is both convenient for installation, and provides stable support for the bean when air flow presses against it rearwardly and downwardly.

Figure 9:
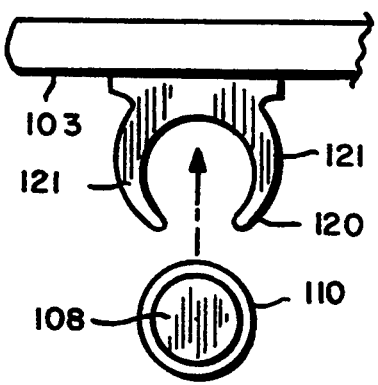
FIG. 9 is a side view of a portion of the right edge of the embodiment of FIG. 7, as shown by 9—9 in FIG. 7.

FIG. 9 illustrates the functioning of the channel clips, using the rightmost clip 120 as an example. This clip has curved resilient side portions 121, which are sized to accept the right beam segment 110. When the segment is pressed into the clip, therefore, the side portions successively move aside and then spring back, to grasp the beam segment.

Figure 10:
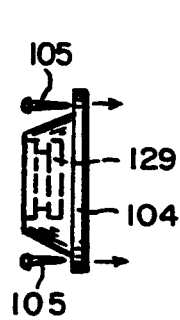
FIG. 10 is a cross-sectional view of the embodiment of FIG. 7 as shown by 10—10 in FIG. 7, with the central pivoting segment in its stowed position.

Referring to FIG. 10, the leftmost clip 114 holds the left beam segment 112, and the central pivoting beam segment 122 is pivotably held to the left beam segment using the hinge pin 124. A spacer 123 separates the left beam segment from the pivoting beam segment at the pin. The central clips 116, 118 are offset by the same center-to-center distance as are the left beam segment and the central pivoting beam segment. A further clip (not shown) may be provided to hold the central pivoting beam segment in place when the air flow director is in its folded position. It is also possible to use a locking knee joint between the left beam segment and the central pivoting beam segment.

In operation of the second embodiment of the invention, and referring to FIG. 7, the user opens the tailgate of the truck and places the air flow director 100 at the back of the bed in roughly the inclined position that it is to occupy, except somewhat folded. The user roughly engages the ends of the studs 106, 108 with their respective brackets 102, 104 and straightens the air flow director by pushing or pulling downward in the vicinity of the hinge 113. The user then makes sure that the studs properly engage their respective brackets, and pivots the central pivoting beam segment 122 from its storage position to its operating position (see dashed line 125). The pivoting beam portion is held clipped in place by the two central clips 116, 118.

In the device according to this embodiment, the beam is not held in place as a result of a compressive force within the beam, but rather is supported by the brackets 102, 104. The spring force in the slugs 106, 108 is relatively small and serves simply to assist in installing and centering the device. It is noted that a fastening tie may be provided to hold the device in its folded position. This tie may be located at the same height on the panels as are the beam halves. When the tie is attached to both panels in a closed position, it will therefore pass in front of the ends of the slugs and thereby hold the slugs retracted in their respective beam segments.

It is possible to mix features from the first and second embodiments of the invention. For example, the pivoting central segment mechanism could be used with straps or bed-mounted brackets. In addition, other configurations of the air flow director according to the invention are possible. For example, instead of a single centrally located hinge, two or more hinges may be used along with two or more latching mechanisms. Alternatively, the deflector panel may be hinged along a diagonal axis. In another example, the living hinges can be replaced with other types of hinges, such as pin hinges, or with couplings, which may allow the hinged parts to be separated. A screw-based width adjustment mechanism is also possible, and multiple rows of channel clips may be provided to allow the beam to be placed at different locations on the panel.

It is also contemplated to place a sign on the bottom of the bag that would read "PLEASE CALL POLICE" or the like. The bag could then be removed and turned on its side in case of an emergency. Alternatively, in strap-based embodiments, the straps can be used to hold the bag in a position that exposes the message to passers-by. The bag can be held in its operating position either permanently or removably. For example, channel clips similar to the ones described above may be used. These can be sewn or glued to the bag.

The air flow director described above can therefore be adjustable and may be folded for easy storage. It is further possible, using straps, to mount the air flow director in a truck without requiring any hardware to be mounted on the truck. Alternatively, although the air flow director conceals items stowed beneath it, the user may want to install a locking mechanism. The hasp of this mechanism is easy and safe to install, as it is located on the tailgate and therefore quite accessible. The hinge 19 makes the device simple to place in the truck, even if there are large wheel wells and somewhat of an inward lip on the sides of the truck bed.

The flow director may also be adapted to fit in many different kinds of trucks. As a result, separate versions for a great variety of truck models need not be manufactured, stored, and displayed. Manufacturers can therefore benefit from economies of scale, and wholesalers and retailers may save storage space, inventory administration costs, and display space by carrying a small number of universal air flow directors (e.g., three models).

Adaptability can also benefit the user in that the air flow director can be moved from truck to truck. This can be useful for users who operate a fleet of vehicles. For example, an owner of a specially equipped truck and a general-purpose truck might mount the device on the specially equipped vehicle when it is used for long distance trips, and otherwise leave the device on the general-purpose vehicle. Furthermore, when replacing a vehicle, the device may be movable from the old vehicle to the new one.

The air flow director can have the further benefit that it may be folded in such a way that it is easily stowed within the cab of the vehicle, or other relatively small compartment in the truck. This makes it is less likely to be stolen, or covered with cargo and damaged. And because it can generally be kept out of harm's way, it need not be built to be resistant to the battering of large loads.

This feature makes the invention particularly applicable to typical truck uses. As noted above, truck operators often drive their trucks empty during part of a trip, and full during other parts of the trip. The air flow director of the invention makes it easy for such an owner to install the device when traveling with the truck empty and to remove it when traveling with the truck full. The overall ease of use, versatility, and/or universality make it likely that an operator will use the air flow director of the invention regularly and thus benefit from the resulting fuel savings.

Referring to FIGS. 12 and 13, a third embodiment 130 of the invention is installed permanently within a special-purpose cavity in a truck, preferably at the time of manufacture of the truck. This air flow director includes a deflector panel 132 and a support mechanism 134 mounted on the underside of the rear edge of the air flow deflector panel. Two protrusions 138, 139 are mounted on the front edge of the underside of the deflector panel. These support respective rotatably mounted wheels or rollers 140,141, which may be made of Nylon. The support mechanism includes a handle 162, and two bars 150, 152. At the end of each of the bars are respective bolts 154, 156. These may be made of Nylon and are slideably held in a generally horizontal orientation by brackets 153. In an alternative embodiment, the bolts can operate separately, with each one having a pin-and-slot structure similar to that of the latching mechanism shown in FIG. 5.

The truck bed 142 includes a trough 136 which extends from between the wheel wells 144 to the back of the truck. At the front of the trough, on either side of the trough, are tracks 146, 147 recessed below the trough. These may be built into the truck body, and cooperate respectively with the rollers 140, 141.

At the rear of the trough is a depression 137, which is sized to hold the support mechanism 134. Two holes 158, 160 are provided in the sides of the truck's cargo hold, preferably in a frame post of the truck. An additional expansion 131 of the cavity may also be provided under a portion of the cavity, to act as a trunk volume (e.g., for storing a spare tire or the like).

In operation, when the air flow director is not in use, the air flow deflector panel 132 rests in the trough 136 on the bottom of the bed 142, and the top of the panel forms a portion of the bed (i.e., the top of the panel is flush with the rest of the bed). In this position, the support mechanism 134 rests in the depression 137. By careful design and tolerancing, a very sturdy and uniform bed can be achieved while the air flow director of the invention is not in use.

When the truck user wishes to use the air flow director 130, he or she opens the tailgate and pulls the deflector panel 132 upwardly and rearwardly, thereby moving the panel back towards the end of the truck. A handle may be provided in the upper surface of the deflector panel making it easier for the user to move the panel. Part of the trough may also be made to extend beyond the panel by a small amount to enable lifting of the panel.

The user then holds the bolts 154,156 in general alignment with the holes 158, 160 in the sides of the cargo hold, and turns the handle 162 counterclockwise to move the bolts into the holes. The air flow director may be positioned in the truck such that this alignment is produced when the panel is pulled fully backward and rested against the back wall of the truck on either side of the tailgate. Once the bolts are inserted in the holes, the air flow director is solidly supported, and the tailgate may be closed and the vehicle operated. To lower the panel, the user holds the panel, turns the handle clockwise to disengage the bolts from the holes, and lowers the panel into the trough.

In this embodiment, therefore, the air flow director is housed in a special-purpose cavity made up of a trough and one or more grooves. This special-purpose cavity is one type of compartment for storing the air flow director. The term "compartment", as used herein, should be distinguished from the cargo hold above the bed of the vehicle.

Other configurations of this embodiment are possible. For example, the panel may be folded either horizontally or vertically when stored in the special-purpose cavity. A different stowing mechanism may be used with this type of panel, and the corresponding cavity should be deeper. Another approach is to store the folded panel into a cavity in the tailgate, or in the sides of the truck. Such a configuration would require a different type of mechanism for deploying and storing the air flow director. An actuating mechanism such as a remote lever, or even a motor can also be used to assist the user in moving the panel. A lock can be provided to protect items under the panel. In this type of embodiment, such locking may be accomplished by providing a lock on the tailgate, which locks the tailgate in its upright position.

A permanently installed air flow director according to the invention has the advantage that it can be folded in such a way that it leaves the bed of the truck completely unobstructed and ready for use. It is therefore easy for an owner to install the device when traveling with the truck empty or substantially empty and to store it when traveling with the truck full. This embodiment is also highly resistant to theft.

While there have been shown and described what are at present considered the preferred embodiments of the present invention, it will be obvious to those skilled in the art that various changes and modifications may be made therein without departing from the spirit and scope of the invention as defined by the appended claims.

What is claimed is:

1. An adaptor for a truck having a front, a back, and an open bed, comprising:
   a plurality of wind deflector panels each having a top, a bottom, a left side, a right side, a wind deflector surface, and an undersurface,
   a hinge located between each adjacent pair of the panels, and
   a support structure engaging the panels, the support structure being constructed to hold the panels side by side in the back of the truck leaning with their tops toward the back of the truck, their bottoms on the bed of the truck, and their wind deflecting surfaces facing generally upward and forward.

2. The adaptor of claim 1 wherein the support structure includes a folding beam attached to the panels proximate the top of the panels.

3. The adaptor of claim 2 wherein the folding beam includes a pair of beam portions, and a hinged mechanism disposed between the beam portions.

4. The adaptor of claim 1 wherein the support structure includes a bracket for mounting on the bed of the truck.

5. The adaptor of claim 1 wherein the support structure includes one or more straps attached to the panels, the straps being constructed to be removably attached to the truck.

6. The adaptor of claim 1 further comprising a locking mechanism including a first portion for mounting on a tailgate of the truck and a second portion attached to the adaptor.

7. The adaptor of claim 1 wherein the hinge is a living hinge between ones of the panels.

8. The adaptor of claim 7 wherein the panels are generally rectangular.

9. The adaptor of claim 1 wherein said support structure further includes width adjustment mechanism.

10. The adaptor of claim 1 wherein the support structure is a folding beam attached to the panels, and wherein the width adjustment mechanism includes a shaft telescopically mounted in at least one end of the folding beam.

11. The adaptor of claim 1 wherein said support structure further includes a plurality of width adjustment mechanisms.

12. The adaptor of claim 1 further including a bag attached to the adaptor.

13. The adaptor of claim 1 wherein the acute angle defined by the panel and the bed of the truck is 30° ±5°.

14. The adaptor of claim 1 wherein the adaptor includes two generally rectangular panels, wherein the support structure includes a folding beam attached to the panels proximate the top of the panels, wherein the folding beam includes a pair of beam portions and a hinged mechanism disposed between the beam portions, wherein the support structure further includes one or more elastic straps attached to the panels proximate the bottom of the panels, the elastic straps being constructed to be removably attached to the truck, further including a locking mechanism including a first portion for mounting on a tailgate of the truck and a second portion attached to the adaptor, further including a living hinge mounted between the two panels, further comprising a pair of width adjustment mechanisms each including a shaft telescopically mounted in the folding beam, and further including a waterproof bag attached to the adaptor.

15. An adaptor for a truck having a front, a back, and an open bed, comprising:
   a plurality of wind deflector panels each having a top, a bottom, a left side, a right side, a wind deflecting surface, and an undersurface, the panels being adapted to be placed side by side in the back of the truck leaning with their tops toward the back of the truck, their bottoms on the bed of the truck, and their wind deflecting surfaces facing generally upward and forward,
   a hinge located between each adjacent pair of the panels, and
   a support strap mounted to at least one of the panels, the support strap being adapted to hold the panels in the truck in the leaning position.

16. An adaptor for a truck having a front, a back, and an open bed, comprising:
   a plurality of means for deflecting wind, each said means having a top, a bottom, a left side, a right side, a wind deflecting surface, and an undersurface,
   a hinge located between each adjacent pair of the wind deflecting means, and
   a support means mounted to the wind deflecting means, for holding the means for deflecting wind side by side in the back of the truck leaning with their tops toward the back of the truck, their bottoms on the bed of the truck, and their wind deflecting surfaces facing generally upward and forward.

* * * * *